United States Patent
Lalwaney (10) Patent No.: US 6,901,058 B2
(45) Date of Patent: May 31, 2005

(54) SYSTEM AND METHOD FOR ENABLING MULTICAST IN A CDMA NETWORK

(75) Inventor: Poornima Lalwaney, San Diego, CA (US)

(73) Assignee: Nokia Corporation, Espoo (FI)

( * ) Notice: Subject to any disclaimer, the term of this patent is extended or adjusted under 35 U.S.C. 154(b) by 136 days.

(21) Appl. No.: 10/226,071

(22) Filed: Aug. 22, 2002

(65) Prior Publication Data

US 2004/0037237 A1 Feb. 26, 2004

(51) Int. Cl.⁷ .............................................. H04B 7/216
(52) U.S. Cl. .................................... 370/320; 370/342
(58) Field of Search ................................ 370/310, 315, 370/316, 319, 320, 328, 329, 335, 342, 351, 389–390, 431–432, 441, 469, 479, 208–209

(56) References Cited

U.S. PATENT DOCUMENTS

2002/0031082 A1 * 3/2002 Lundby et al. ............ 370/209
2002/0142730 A1 * 10/2002 Hsu ............................ 455/72
2002/0150098 A1 * 10/2002 Sharony ..................... 370/390
2002/0167921 A1 * 11/2002 Vakil et al. ................. 370/331
2003/0039235 A1 * 2/2003 Odenwalder et al. ....... 370/342
2003/0053478 A1 * 3/2003 Hsu et al. ................... 370/441

* cited by examiner

Primary Examiner—Huy D. Vu
Assistant Examiner—Jason Mattis (57) ABSTRACT

An improved wireless communications system for efficiently delivering multicast transmissions within a CDMA wireless communications network. To minimize use of network resources, a multicast group Walsh code is dynamically assigned for transmissions to group members for the duration of the session. Reverse link multicast long code covers are assigned by a base station controller and transmitted to the mobile station on a forward channel as derived from the multicast IP address. A multicast reflection function is provided at the base station controller or the IP gateway to transmit multicast messages received from mobile stations to other group members in their coverage area. The assigned group Walsh codes and long codes are used to spread all multicast transmissions on the CDMA forward and reverse channels, respectively.

25 Claims, 6 Drawing Sheets

Prior Art

SYSTEM AND METHOD FOR ENABLING MULTICAST IN A CDMA NETWORK

FIELD OF THE INVENTION

The present invention relates generally to code-division multiple access (CDMA) wireless telecommunications systems, and more specifically to improvements in the physical layer and in the link layer by using specifically-assigned Walsh codes on the forward channel and multicast-specific long code masks on the reverse channel to provide enhanced and efficient support for multicast transmissions on the CDMA air interface. A reflection function resident in the CDMA network utilizes the specifically-assigned Walsh codes the multicast-specific long code masks to efficiently distribute multicast transmissions in the CDMA environment.

BACKGROUND OF THE INVENTION

CDMA, at least in the general sense, is a form of cellular telecommunications. Cellular telephones are portable radios that enable users, often called subscribers, to communicate with each other through a communications network. This wireless-communication network is sometimes called a public-land mobile network (PLMN), and the PLMN is typically connected to other communications networks so that subscribers may communicate through them and with their subscribers as well. The most familiar of these other networks is the familiar public-switched telephone network (PSTN), sometimes referred to as the plain old telephone system (POTS). The Internet is another well-known network that may be in communication with a PLMN, although it is generally used for data rather than voice traffic. The PLMN may also be connected to smaller networks, such as intranets, local-area networks (LANs), or virtual private networks (VPNs). The PLMN, in general, connects to these other networks through devices called gateways, which help translate the communication from a format understood by one network to a format understood by another. In addition, gateways also enable communications between different PLMNs and possibly different portions of a single PLMN.

Although cellular telephones are radio transmitters, various cellular technologies enable a great many of them to be used within relative proximity to each other. For one thing, while high-powered radio transmitters are capable of transmitting a signal that can be picked up by a receiver miles away, cellular phones communicate within a smaller range, typically one to ten miles. And rather than calling a central network antenna, they communicate with a nearby base station antenna, one associated with the area—or cell—in which they are currently located. The base station, in turn, communicates with the rest of the PLMN to establish a connection for the call. Note that in such a "wireless" network, the "wireless" communication takes place between the subscriber's mobile phone and the base station. This link is sometimes referred to as the "air interface". The rest of the network is fixed in location and generally interconnected by wire, cable, or fiber (although radio frequency, microwave frequency, infra-red, or some other technology may also be used).

At this point, it should also be noted that as the terms "cellular (or cell) phone" and "mobile phone" are sometimes used interchangeably, and will be treated as equivalent herein. Both, however, are a sub-group of a larger family of devices that also includes, for example, certain computers and personal digital assistants (PDAs) that are also capable of wireless radio communication in a cellular network. This family of devices will for convenience be referred to as "mobile stations" (regardless of whether a particular device is actually moved about—or even capable of being moved).

Figure 1:
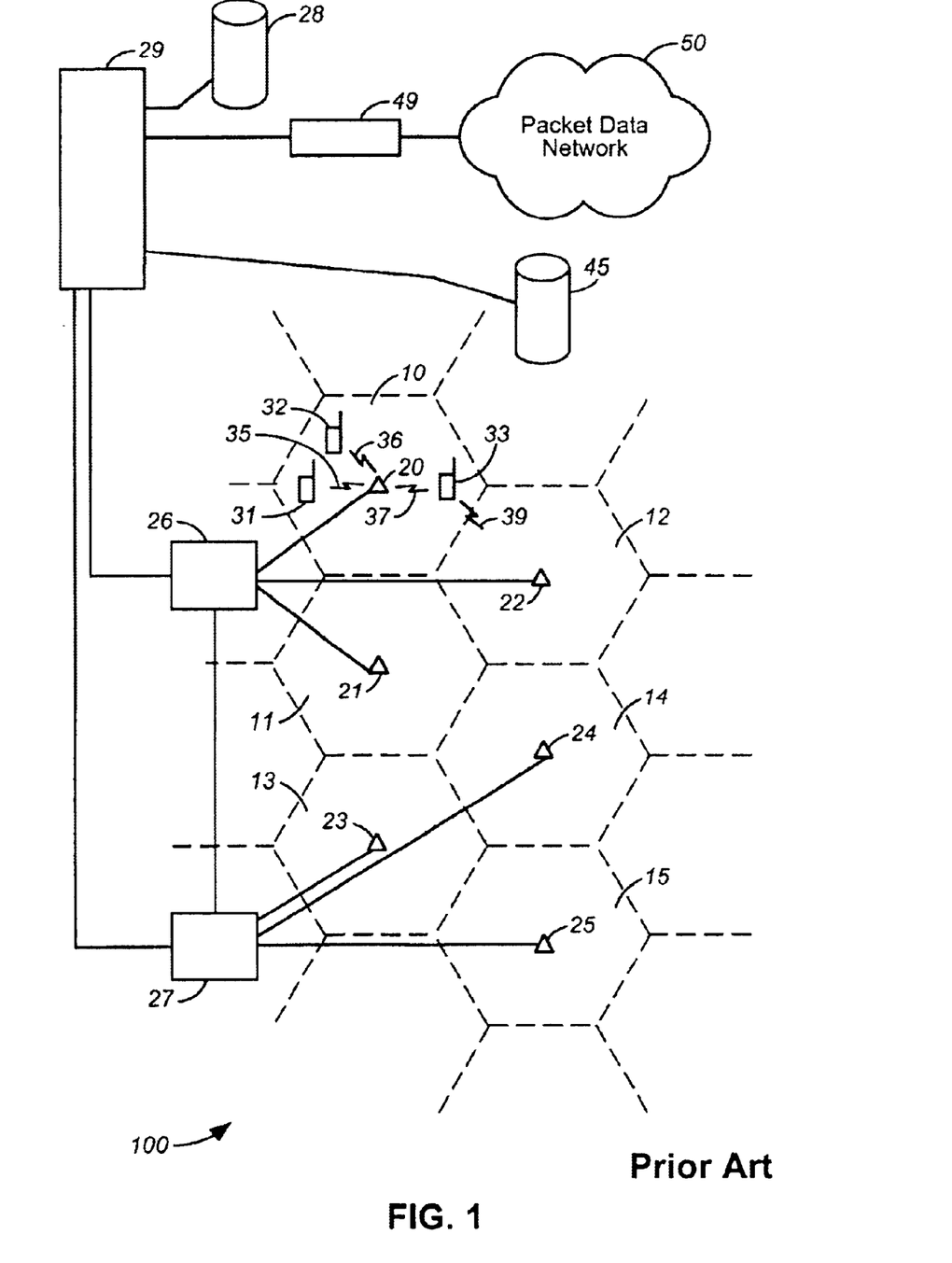
FIG. 1 is a block diagram illustrating a typical wireless telecommunication system.

FIG. 1 is a simplified block diagram illustrating the configuration of a typical PLMN 100. As mentioned previously, the entire geographic area covered by such a network (which is not shown in FIG. 1) is divided into a number of cells, such as cells 10 through 15 delineated by broken lines in FIG. 1. Although only six cells are shown, there are typically a great many. In the illustrated embodiment, each cell has associated with it a base transceiver station (BTS) for example BTS 20 for transmitting and receiving messages to and from mobile stations (MS) in cell 10, here MS 31, MS 32, and MS 33, via radio frequency (RF) links 35, 36, and 37, respectively. Mobile stations MS 31 through MS 33 are usually (though not necessarily) mobile, and free to move in and out of cell 10. Radio links 35–37 are therefore established only where necessary for communication. When the need for a particular radio link no longer exists, the associated radio channels are freed for use in other communications. (Certain channels, however, are dedicated for beacon transmissions and are therefore in continuous use.) BTS 21 through BTS 25, located in cell 11 through cell 15, respectively, are similarly equipped to establish radio contact with mobile stations in the cells they cover.

BTS 20, BTS 21, and BTS 22 operate under the direction of a base station controller (BSC) 26, which also manages communication with the remainder of PLMN 100. Similarly, BTS 23, BTS 24, and BTS 25 are controlled by BSC 27. In the PLMN 100 of FIG. 1, BSC 26 and 27 are directly connected and may therefore both communicate and switch calls directly with each other. Not all BSCs in PLMN 100 are so connected, however, and must therefore communicate through a central switch. To this end, BSC 20 is in communication with mobile switching center MSC 29. MSC 29 is operable to route communication traffic throughout PLMN 100 by sending it to other BSCs with which it is in communication, or to another MSC (not shown) of PLMN 100. Where appropriate, MSC 29 may also have the capability to route traffic to other networks, such as a packet data network 50. Packet data network 50 may be the Internet, an intranet, a local area network (LAN), or any of numerous other communication networks that transfer data via a packet-switching protocol. Data passing from one network to another will typically though not necessarily pass through some type of gateway 49, which not only provides a connection, but converts the data from one format to another, as appropriate. Note that packet data network 50 is typically connected to the MSC 29, as shown here, for low data rate applications. Where higher data rates are needed, such as in 3G CDMA networks, the packet data network 50 is connected directly to the BSCs (26, 27) which in such networks are capable of processing the packet data.

A cellular wireless system such as the one illustrated in FIG. 1 has several advantages over a central antenna system. As the cells are much smaller than the large geographic area covered by a central antenna, transmitters do not need as much power. This is particularly important where the transmitter is housed in a small device such as a cell phone. In addition, the use of low-power transmitters means that although the number of them operating in any one cell is still limited, the cells are small enough that a great many may operate in an area the size of a major city. The mobile stations do not transmit with enough power to interfere with others operating in different cells (not adjoining the one they are in). In some systems, this enables frequency reuse, that is the same communication frequencies can be used in non-adjacent cells at the same time without interference. In other systems, codes used for privacy or signal processing may be reused in a similar manner.

In addition to the cellular architecture itself, certain multiple access schemes may also be employed to increase the number of mobile stations that may operate at the same time in a given area. In frequency-division multiple access (FDMA), the available transmission bandwidth is divided into a number of channels, each for use by a different caller (or for a different non-traffic use). A disadvantage of FDMA, however, is that each frequency channel used for traffic is captured for the duration of each call and cannot be used for others. Time-division multiple access (TDMA) improves upon the FDMA scheme by dividing each frequency channel into time slots. Any given call is assigned one or more of these time slots on which to send information. More then one voice caller may therefore use each frequency channel. Although the channel is not continuously dedicated to them, the resulting discontinuity is usually imperceptible to the user. For data transmissions, of course, the discontinuity is not normally a factor.

Code-division multiple access (CDMA) operates somewhat differently. Rather than divide the available transmission bandwidth into individual channels, individual transmissions are spread over a frequency band and encoded (as explained more fully below). By encoding each transmission in a different way, each receiver (i.e. mobile station) decodes only information intended for it and ignores other transmissions. The number of mobile stations that can operate in a given area is therefore limited by the number of encoding sequences available, rather than the number of frequency bands.

Returning to FIG. 1, when a mobile station, for example MS 33, leaves cell 10 and enters cell 12, its communication link to the network is transferred from BTS 20 to BTS 22. If MS 33 is inactive, its relocation means only that a radio link will be established with BTS 22 when necessary to originate or terminate a call. If MS 33 is actively engaged in an on-going communication, however, or in the process of call set-up as it moves from one cell to the other, PLMN 100 will attempt to maintain this communication through a process called "handoff".

Using a predetermined algorithm, MS 33 will determine (or be notified) that handoff is appropriate and will then switch from one BTS to another. Handoffs may be "soft" or "hard". A hard handoff means that the radio link 38 to BTS 20 is broken before a new link to BTS 22 is established. Preferably, the discontinuity in service is barely perceptible to the subscriber. (It may be highly disruptive to data transmissions, however.) In a soft handoff, active MS 33 will establish radio link 39 with BTS 22 while it is still located in cell 10 (and may establish radio links with other BTSs in other cells as well). MS 33, BTS 20, and BTS 22 cooperate to continually evaluate the relative signal strength of radio links 37 and 39 to determine, according to a predetermined algorithm, when handoff is appropriate. Because radio link 39 is established before radio link 37 is broken, this type of transfer is preferable to the hard alternative because it lessens the interruption of service to the subscriber and the risk of dropping the call entirely. As MS 33 moves from cell 10 to cell 12, this change in location (or, more properly, change in serving BTS) is preferably reflected in the visitor location register (VLR) 28, a database connected with (or incorporated as a part of) MSC 29. By tracking the serving BSS for mobile stations, of course, PLMN 100 can more efficiently establish a connection to a target mobile station. Because they use code division, as opposed to frequency division, CDMA networks typically provide for soft handoffs.

Inactive mobile stations may also, of course, relocate from one cell to another, or even from one network-covered area to another. In this case, the MS location information in a VLR such as VLR 28 may be updated when the mobile station registers. Registration is simply the process of sending out a signal by the mobile station when it is powered-up, and periodically thereafter. The registration signal is picked up by a nearby BTS (and often by more than one), which relays the location information to, for example, VLR 28 through MSC 29. Periodically, VLR 28 will also notify the home location register (HLR) 45, a central database of PLMN 100 that tracks not only the location of mobile stations that subscribe to the PLMN 100, but also subscription information such as the services subscribed to MS capabilities, etc.

When a call directed to a particular mobile station is placed, the location information in HLR 45 and the various VLRs is checked so that the call can be appropriately routed. A page or other incoming-call notification is broadcast by the BTS serving the cell where the mobile station's location was last recorded and, if the mobile station responds, a radio link terminating the call is established. If the mobile station does not respond to this page, the PLMN may send out paging messages in other cells in an attempt to locate the target mobile station. If, after a period of time, all such pages are unsuccessful, the PLMN returns an appropriate message so that the originating caller can be notified that the target mobile station is unavailable. If the service is available, the disappointed call originator may be given the opportunity to leave a voice or numeric message that is recorded on a centrally accessible database (not shown) from which it can be transmitted to the intended call recipient at a later time.

The PLMN 100 described above has been discussed in the context of a call originating or terminating at a single mobile station. Such a call may, of course, involve a second mobile station, even one in the same cell as the mobile station with which it is communicating. Although such a call may be routed through less of the PLMN, with respect to each party, it is conducted as any other call. In other words, the BCS will direct the establishment of a radio link with each mobile station in the same fashion as it would if the call originated (or terminated) outside of the cell. Even if the call routing is done entirely within the BCS, the radio transmissions to each party will follow the standard method. While this is appropriate for a call involving two mobile stations, in other situations an alternative procedure may be preferred.

One such situation involves multicasting. "Multicasting" refers to a manner of sending a given message to a selected group of recipients. (For definitional purposes, such a group could include none or only one recipient, although typically such transmissions are intended for a larger group.) Multicasting may best be understood in contrast to "broadcasting", in which a message is transmitted to all recipients equipped with proper receiving devices, and in contrast to a connection established for private communication between a single sender and a single receiver. Significantly, multicasting does not include the process of simply sending individual but identical messages to a number of users. While this alternative would produce, from the recipient's perspective, the same result as multicasting, it would not be as efficient in terms of system resources. Rather, multicasting provides for the conservation of system resources by transmitting a message so that it is received (or, at least, is available for reception) by members of a defined group and by no others. In other words, multicasting involves not only sending a single message to a plurality of users, but a particular way of doing so as well. Multicasting may be used to send a single message, a sequence of discrete messages, or an extended transmission such as a streaming-video multimedia presentation.

Multicasting is a concept familiar in the Internet-protocol (IP) environment. IP is a packet-switched technology, with information segmented into separately-addressed packets that are sent from a source node to a recipient node. If a source node is sending the same content to multiple recipients, several options are available. One option, of course, is for the human operator to simply execute the sending function a number of times, or program a computer to do so. This is an inefficient use of both the operator's resources and those of the network, however, a deficiency that IP multicasting was developed to correct.

In an IP network, this multicast function is accomplished by assigning a multicast address to the members of a multicast group. Each of these terminals already has (and maintains) a unique IP unicast address, and receives messages directed there. Multicast addresses, which are taken from a set of addresses reserved for the purpose, are assigned when the group is created. A group is created when one member indicates its desire to initiate a group or to subscribe to an existing group (whose multicast address it has learned by other means). In Internet protocol version 4 (IPv4), for example, this would be done using an Internet Group Management Protocol (IGMP) message. In IPv6, a Multicast Listener Discovery (MLD) message would be used.

Significantly, when a multicast group is established and a multicast address is assigned to the group, the multicast message is sent to each member (assuming they are listening for messages) without being copied multiple times at the originating router. The network simply fans out the message (packet stream) in the direction of the group members until the message arrives at each.

While multicasting is a familiar process in other types of networks, especially in packet-switched data networks such as Ethernet local area networks (LANs), no corresponding procedure is yet available in cellular networks operating according to a CDMA standard. A scheme for efficiently facilitating multicast in the CDMA environment is needed and would permit CDMA networks to realize the efficiencies associated with such transmissions. The system and method of the present invention provide just such a solution.

SUMMARY

The present invention is directed to a system and method for facilitating multicast message delivery within a CDMA wireless communication network. In one aspect, the invention is a system for handling multicast messaging in a cellular network that includes a base station transceiver for communicating with mobile stations according to the CDMA standard and a base station controller that dynamically allocates to a multicast group Walsh codes for use in processing forward channel transmissions, and multicast-specific long code masks for use in reverse channel transmissions.

In another aspect, the invention is a method of handling multicast messages in a CDMA network including the steps receiving a mobile station request to join a multicast group and assigning a Walsh code for use in transmitting multicast message to members of the group. A multicast long code mask is assigned for use by the mobile group members for multicast transmissions on the reverse channel. The method may further include the steps of receiving a multicast message from a mobile group member and retransmitting it using a reflection function, which may be resident in the BSC, the PDSN, or in a network gateway.

DETAILED DESCRIPTION

The present invention is directed to a system and method for multicasting packet-data messages such as Internet protocol messages (IP) within a CDMA network. As mentioned above, CDMA is one multiple access technique that is growing in popularity. While in many CDMA networks packet-data transmission is provided for, this is not universally the case. The advantages of the present invention obtain where IP packet data transmission is enabled. There may be circumstances, however, where the system of the present invention may be deployed or used to advantage in networks where IP messaging is not yet supported.

Figure 2:
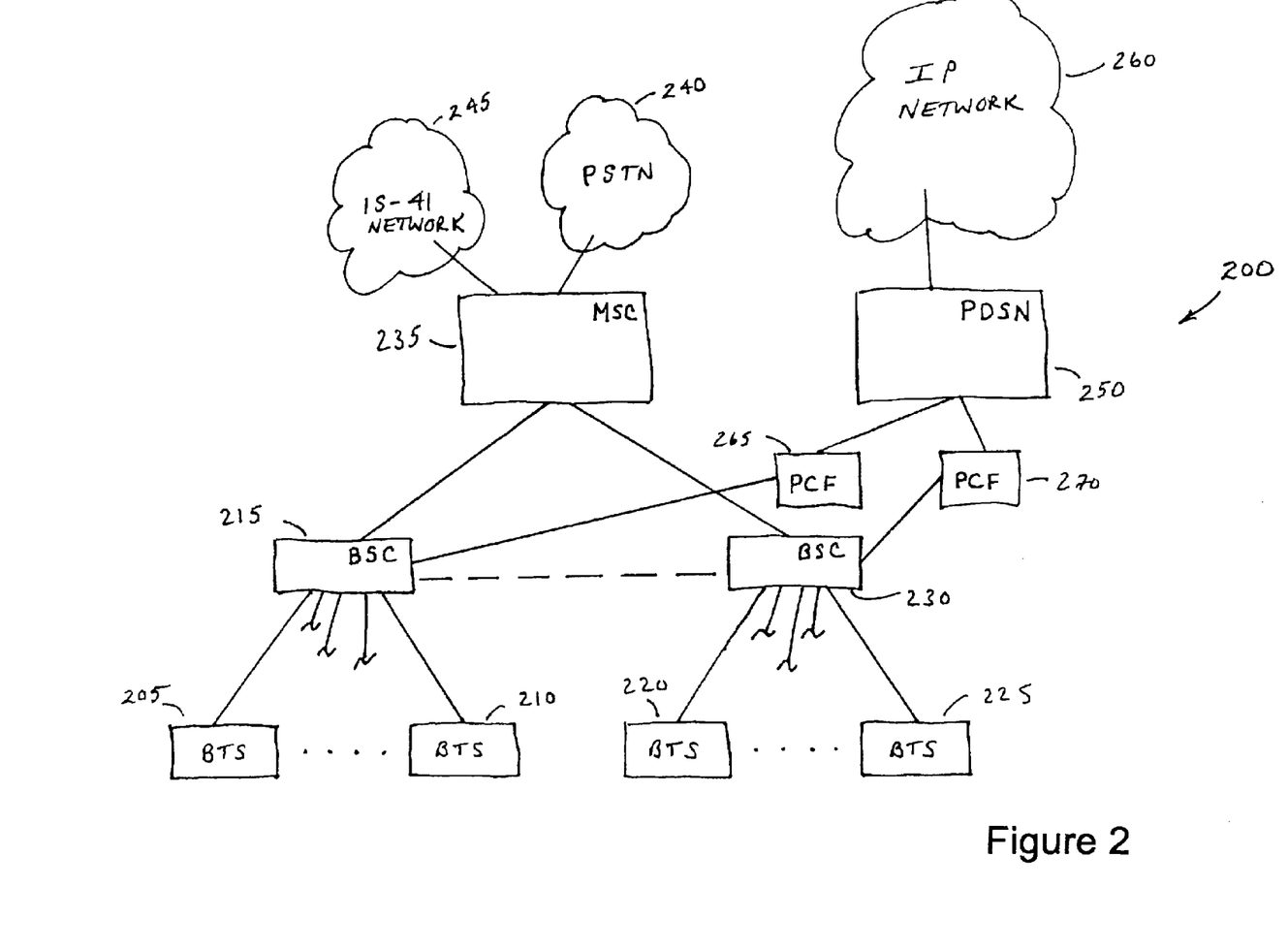
FIG. 2 is a simplified block diagram illustrating selected components of a wireless PLMN that may be used for multicast messaging according to an embodiment of the present invention.

FIG. 2 is a simplified block diagram illustrating selected components of an IP-data compatible wireless PLMN 200 that may be used for multicast messaging in accordance with an embodiment of the present invention. Similar to the PLMN 100 of FIG. 1, mobile stations (not shown in FIG. 2) communicate with the network through a BTS covering the geographic area cell which they are located, and at times my communicate with those BTSs covering neighboring or overlapping cells as well. Note, however, that FIG. 2 is drawn schematically and does not reflect the relative geographic locations of the illustrated components. Each BTS is controlled by a BSC, which is typically though not necessarily associated with a plurality of BTSs. In FIG. 2, this is shown by BTS 205 and BTS 210 connected with BSC 215, and BTS 220 and 225 connected to BSC 230. BSC 215 and BSC 230 may also be in communication with each other, as shown by the broken line connecting them. The terminated lines emanating from BSC 215 and BSC 230, as well as the ellipses between the BTSs, indicates that there maybe more than two, and in fact many, BTSs operated by and through a BSC. As in PLMN 100 shown in FIG. 1, voice communications are forwarded to the MSC 235, from which they can be switched to another BSC or to the PSTN 240, as appropriate. MSC 235 is also in communication with Interim Standard-41 (IS-41) network 245. IS-41 is a standard for sending control messages and enabling roaming in a CDMA wireless network. Voice traffic is sent through the MSC except that which is directed to a mobile station in a geographic area covered by the BSC, and except traffic that can be switched between BSCs that are in direct communication with each other.

In the illustrated embodiment, data communications are not sent through MSC 235, but instead are handled by a Packet Data Serving Node (PDSN) 250. IP packet data from a mobile station that are received at the BSC is passed through a packet control function (PCF), and relayed to the PDSN 250 for transmission through an EP network 260 such as the Internet. In the embodiment of FIG. 2 data traffic received in BSC 215 is passed through PCF 265, and data traffic to and from BSC 230 through PCF 270. Data traffic from the IP network 260 is likewise routed to PDSN 250 and from there sent to the appropriate BSC through a PCF. Data is transferred between PDSN's over an IP network. This transfer is preferably enabled via the Mobile IP standard, to ensure that the user's active data session is not disrupted by mobile station handoffs. In general, it is more efficient, and naturally so, for and transmission to be routed through the communication system at the lowest possible level, avoiding unnecessary use of higher level components and the associated formatting and reformatting.

Figure 3:
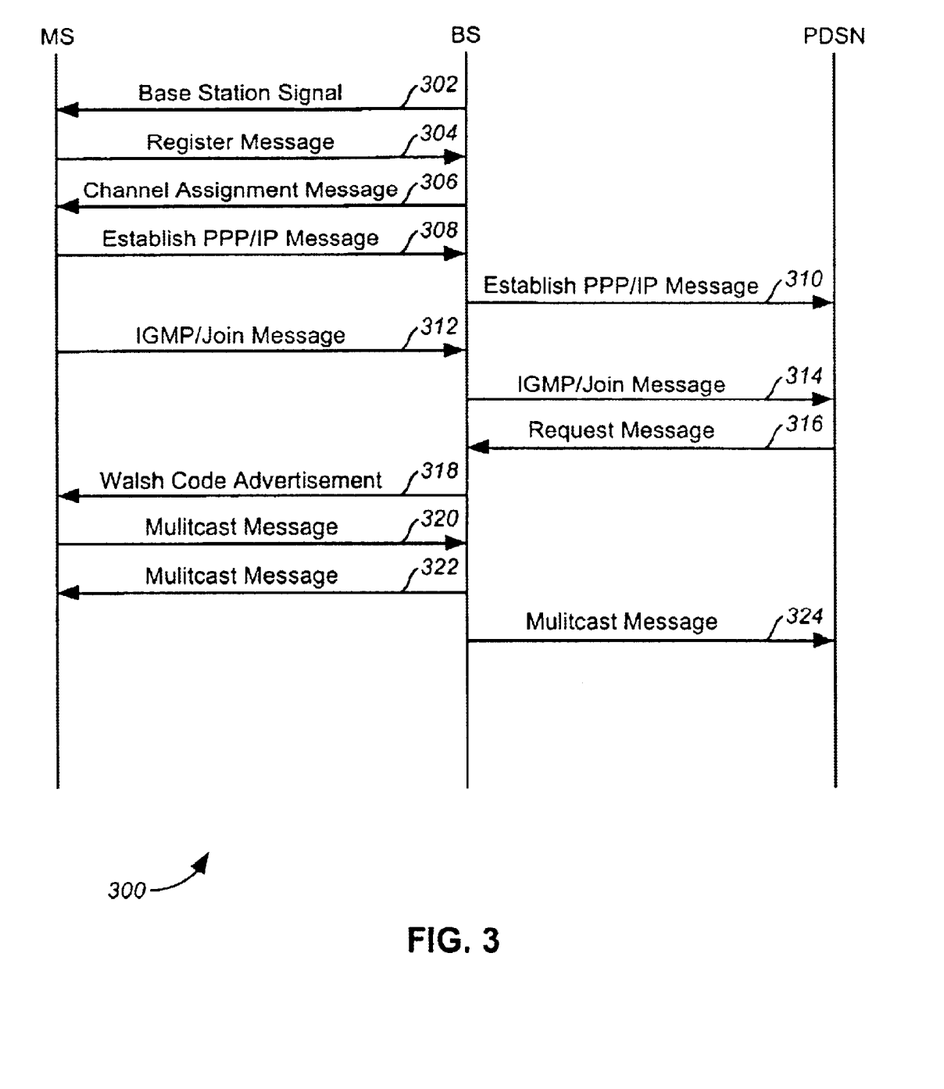
FIG. 3 is a signal flow diagram illustrating the message sequence of processing a multicast message according to an embodiment of the present invention.

FIG. 3 is a signal-flow diagram 300 illustrating the communication sequences between the components illustrated in FIG. 2. Note that in FIG. 3, the serving BTS, the BSC, and the PCF may be for simplicity considered a single function, here labeled as the base station (BS). This is not to imply a requirement, however, that these three functions are or need to be co-located in the same physical location. The signal flow assumes that a mobile station (MS) will, at some point, "enter" the area. This entry may simply amount to a subscriber turning on a mobile station, or to a mobile station actually entering the cell or area controlled by the BSC. The base station in a given cell continuously transmits a signal 302 to make its presence known to mobile stations operating in the area, and provides the information necessary for them to synchronize with the base station.

However the mobile station enters the base-station area, to communicate it must eventually acquire the base-station signal. Armed with the necessary communication parameters, it 'registers', or sends a message 304 making its presence known to the base station. Typically, the MSC is also notified of the registration and this location information is stored on the VLR, and perhaps eventually in the mobile station's HLR (these messages not shown in FIG. 3). In this way, the network locates the mobile station for the purpose of terminating calls including, in accordance with the present invention, multicast calls (although multicast call termination may not actually follow a path through the MSC).

In order to enable multicasting, at registration the base station allocates a forward channel for multicast control messages. The messages on the multicast control channel include support needed for dynamic multicast group creation such as multicast group membership queries (IGMP) from other group members and IGMP responses. In addition to IGMP messages, new message formats to communicate CDMA channel assignments and session descriptions of multicast sessions to which the user dynamically subscribes may also be sent on this multicast control channel. (Dynamic subscriptions are those initiated on the fly and not known during registration.) The BS sends a message 306 to the MS informing it of the channel assignment. The mobile station, of course, need not communicate with the EP network at all, but if it wishes to do so it sends a message 308 to the BS, which is then routed 310 to the PDSN to establish a PPP/IP session. In certain situations, of course, such as soft handoff, a session may be in progress and all that is required is making sure that the correct routing information is available to the PDSN.

The MS may now elect at any time to join a multicast session, and does so by sending an IGMP JOIN message 312 to the BS on the previously allocated packet-data channel. The JOIN message is forwarded 314 by the BS to the PDSN. The PDSN then initiates an R-P (Radio Access Network (RAN) to PDSN interface) session to accommodate multicast traffic to the joining MS and sends a request 316 to the BS to allocate a forward channel for multicast broadcasts in this session. The request 316 contains an R-P session ID. Upon receiving this request, the BS dynamically assigns this channel by allocating a specific Walsh code for forwarding multicast traffic to the MS (and any other members of the group operating in the area). In a preferred embodiment, where the group is associated with a multicast IP address, the mobile station and the BSC algorithmically derive the multicast Walsh code from the IP address itself. In message 318, the BS then advertises the Walsh code assignment for the forward broadcast/multicast channel and the associated multicast group IP address and group name on the forward multicast control channel assignment transmitted in signal 302. The forward broadcast/multicast channel is the common channel on which the single copy of shared multicast content is delivered to all mobile stations that have subscribed to the specific multicast group.

The mobile station or mobile stations in the group receiving the Walsh code assignment not only use it to process received multicast messages directed to them, but in accordance with one embodiment of the present invention also use it to process multicast messages being transmitted on the reverse channel, as explained more fully below. For transmitting messages on the reverse channel, a long code mask is either assigned or is derived from the IP address of the multicast group. When the MS sends a multicast message, here enumerated as message 320, it uses the long code mask (or cover) to process the message for transmission. The BS receiving a multicast message from the MS, which the BS recognizes from the associated long code mask, first determines whether other members of the group are also operating in the base station area. If so, a reflection function in the BS (if present) retransmits the message 322, again using the allocated multicast Walsh code. Such a message would be received and understood by all group members registered in the area covered by the BS. If the BS does not have the not have the ability to delineate entire PPP frames, the multicast traffic reflection function should be implemented in the PDSN.

Note that if the reflection function is implemented at the PDSN, the MS may simply transmit multicast messages as it would any other packet data (and over the same channel). This may occur because either the reflection function is not resident in the BS or, if there, is for some reason not to be utilized. If group members are also located elsewhere, the multicast message is also forwarded 324 to the PDSN for appropriate distribution. Group members may naturally include other CDMA mobile stations as well as devices connected directly to the IP network. Group members that are able to receive IP multicast messages in the usual way will do so, while other mobile stations will receive the messages in accordance with the system and method or the present invention.

In order to create dedicated multicast channels for IP multicast transmissions, the present invention takes advantage of the coding techniques of CDMA. As explained above, CDMA operates somewhat differently from frequency-channelization schemes. The forward channel "separation" in CDMA is achieved by Walsh-code spreading the signal intended for a particular mobile station using one of a finite number of available Walsh codes (a small number of which are usually reserved for overhead purposes). Present CDMA systems (IS-95 and CDMA2000) use 64 Walsh code space. Future systems may use a higher Walsh code space. The present invention takes advantage of this Walsh code allocation system to perform efficient multicasting in the CDMA environment.

In an alternate embodiment (not shown), the MS upon registration provides the BS with the IP address associated with a packet-data network node for which the MS wishes to receive a multicast transmission. The channel assignment from the BS then includes a Walsh code associated with that IP address (which may or may not have been previously assigned, depending on whether other MSs in the coverage area are receiving the same transmissions). This may occur, for example, when the MS wishes to receive streaming content that is being transmitted from a single source. Since the MS will not, in this embodiment, send multicast messages to this particular group, no associated long-code mask is assigned, and no reflection function is needed. Where an MS is already receiving the streaming multicast transmission through the CDMA network but is moving between BS coverage areas, the handoff process would also include the multicast information, including the multicast Walsh code, in which case it need not be provided by the MS to the new BS. The MS will, of course, need to be informed of any Walsh code assignment changes associated with the handoff.

Figure 4:
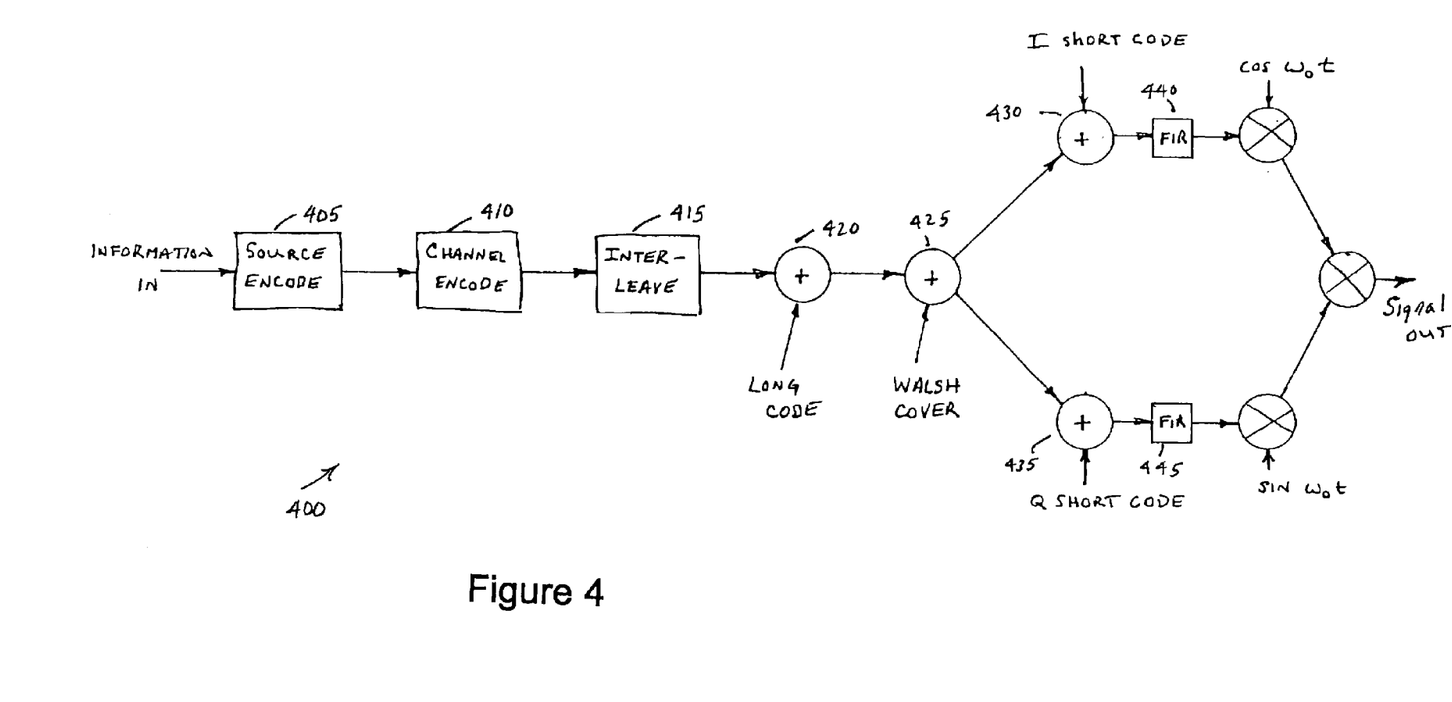
FIG. 4 is a functional block diagram illustrating the processing of a CDMA forward channel signal according to an embodiment of the present invention.

In a CDMA network the forward channel, on which voice or data traffic is transmitted to a mobile station, operates somewhat differently than the reverse channel. The process through which forward and reverse channel and notice is processed in one embodiment will now be briefly explained. FIG. 4 is a block diagram illustrating selected components of an exemplary forward channel processor 400 of the BTS transmitter that may be used in accordance with an embodiment of the present invention. Note that the forward channel processor of FIG. 4 is only one example and other variations are possible. In the source encoder 405, an audible (voice) pattern is digitized, and organized into frames. Error detection bits are also added in source encoder 405. The signal is then convolutionally encoded in channel encoder 410. The signal is then block interleaved with others in interleaver 415 before being spread by a pseudonoise (PN) code. A first adder 420 applies a long code, and a second adder 425 uses a Walsh code to spread the waveform and provide channelization. (The adder symbol here represents the mathematical exclusive-OR (XOR) function.)

Walsh codes provide channelization because they are mutually orthogonal with respect to each other. Each mobile station is assigned a Walsh code for a given session, representing a wave form that it uses to detect the signal from the BTS. Being mutually orthogonal, the Walsh wave form, when applied by a mobile station to a transmission intended for any other recipient results in a zero, and the signal is therefore not detectable. Walsh-code channelization is necessary because transmissions directed at various mobile stations are sent out simultaneously.

After being spread by the allocated Walsh cover, a short code is applied at I-short code adder 430 and the Q-short code adder 435. The short code is used to distinguish the transmission of one BTS from its neighbors (which use the same Walsh codes for channelization). The output of I short code adder 430 and Q short code adder 435 is then filtered in finite impulse response (FIR) filter 440 and FIR filter 445, respectively, before being heterodyned with BPSK (Binary Phase Shift Keying) modulation and QPSK (Quaternary Phase Shift Keying) spreading prior to amplification for transmission. Other modulation schemes may be used as well for CDMA data transmission, including the more spectrally efficient (that is, higher data rates in a given frequency band) higher-order QPSK and QAM (Quadrature Amplitude Modulation) schemes.

Figure 5:
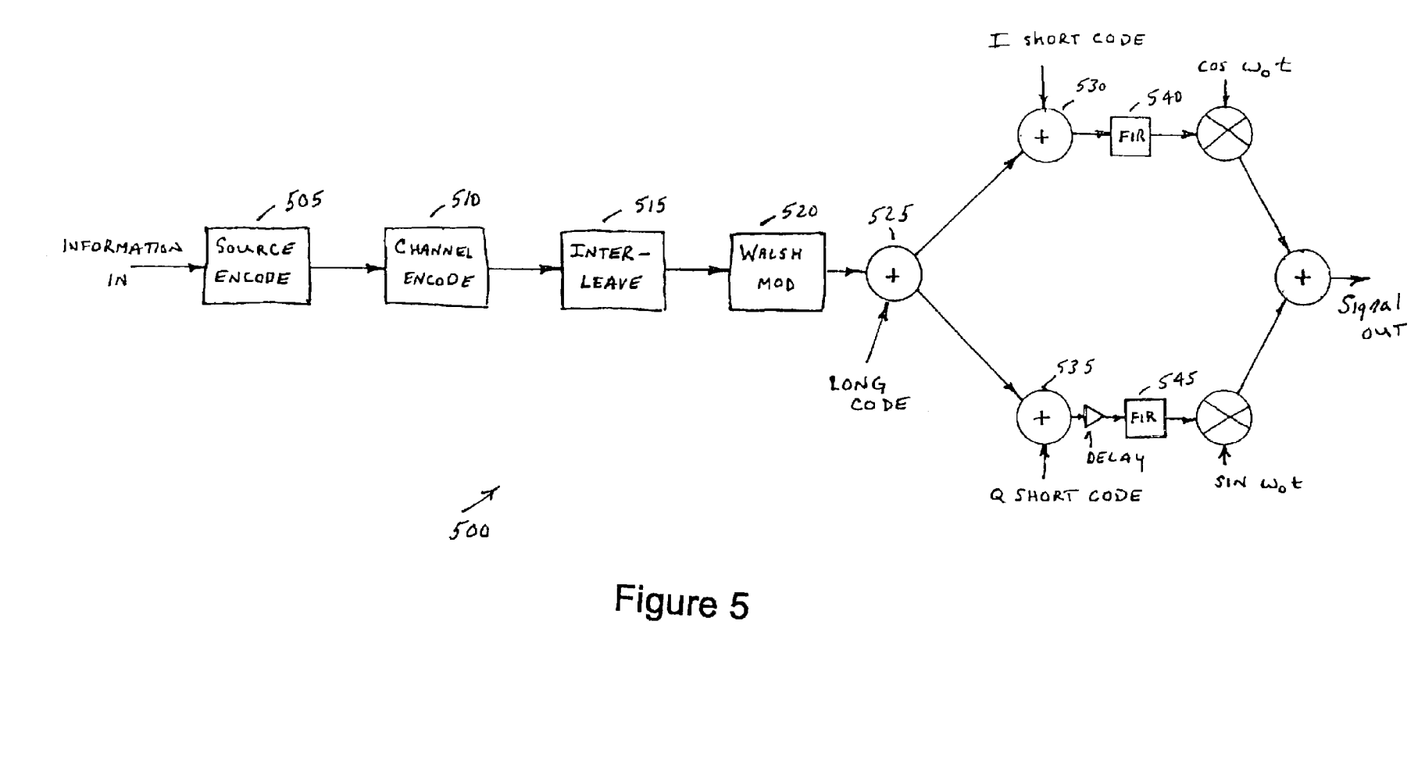
FIG. 5 is a functional block diagram illustrating the processing of a CDMA reverse channel signal according to an embodiment of the present invention.

The processing by a mobile station transmitter of a transmission sent on the reverse channel is shown in FIG. 5. FIG. 5 is a simplified block diagram illustrating selected components of an exemplary transmitter 500 such as one that might be operable in a CDMA mobile station according to an embodiment of the present invention. Note that the reverse channel processor of FIG. 5 is only one example and other variations are possible. Beginning similarly to the BTS transmitter 400 of FIG. 4, speech in mobile station transmitter 500 is first encoded in a source encoder 505 and a channel-coder 510, and is then presented to interleaver 515 for interleaving. Unlike the forward channel transmitter, however, at this point the signal is modulated in modulator 520 with a Walsh-code waveform.

After modulation, channelization is achieved in adder 525 using a long code. In accordance with the present invention, the long code selected for modulation use by adder 525 vanes according to the type of communication being transmitted. For a standard transmission, that is, one sending voice or data information to a single target recipient, a standard long code selection algorithm of the prior art may be used. For a multicast message, however, adder 525 uses the long code generated from the long code mask associated with the multicast group for which the message is intended. In a preferred embodiment, this long code mask is algorithmically derived from the multicast group IP address, if available. For example (although not currently available), a new link-layer header field could be defined for explicitly specifying the IP address to long code mask mapping function to be used on the reverse link. The signal is then processed using an I short code adder 530 and a Q short code adder 535, followed by filters 540 and 545, respectively. The signal is then heterodyned with BPSK modulation and (offset) QPSK spreading for transmission back to the BTS on the reverse channel.

In the BTS receiver (not shown), the signal is received and attributed to a particular mobile station by the long code used. In addition, where the BTS detects a long code mask that has been allocated to a specific multicast user group, the transmission is processed as a multicast message, as described more fully below.

Figure 6:
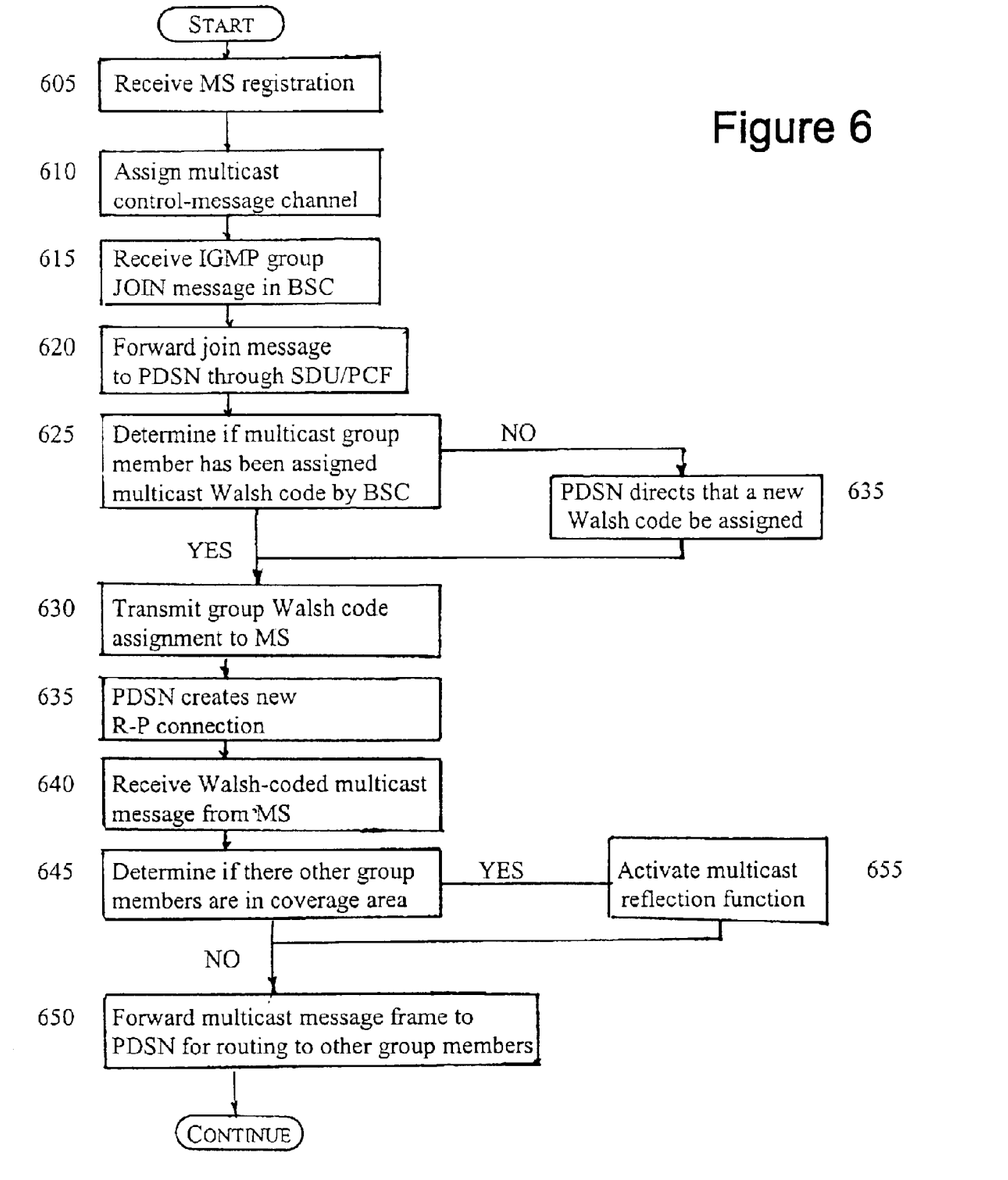
FIG. 6 is a flow chart illustrating a method for multicast messaging according to an embodiment of the present invention.

FIG. 6 is a flow diagram illustrating the process of transmitting a multicast message in a CDMA wireless system according to an embodiment of the present invention. At START, it is assumed that a terminal, most likely a mobile terminal, operating according to a CDMA standard is capable of receiving multicast messages according to the present invention. Naturally, the enhancements and advantages according to the present invention are not obtainable from a device unable to act on them in accordance with the present invention. Such devices should, however, still be able to receive or send packet-data and voice transmissions through the CDMA network. Consistent with the present invention, such devices may include means for participating, albeit in a different manner, in multicast messaging as well. In particular, non-complying devices may nevertheless receive multicast messages from others, or otherwise derive a benefit from the practice of the invention in the system as a whole.

For properly configured devices, however, upon receipt of registration in the BSC (605), the terminal is assigned a broadcast paging channel in the forward direction dedicated for transmission of multicast control messages (step 610), for example IGMP membership queries and JOIN messages. When the controlling BSC receives a JOIN message over a reverse channel from a mobile terminal operating within its coverage area (step 615), it forwards the JOIN message through the SDU/PCF to the PDSN (step 620) as with any other data-packet frame. Note that the mobile terminal itself, at this point, was either already aware of the EP address of the selected multicast group or used ordinary out-of-band signaling methods to determine it.

The PDSN then determines if another member of the same multicast group is already operating within the BSC coverage area (step 625). If so, the Walsh code already associated with this group is sent to the newly identified group member (step 630). If not, the PDSN directs that a new Walsh code be assigned (step 635) by the BSC (the Walsh code resource allocation being a BSC function), and then communicated to the mobile terminal at step 630. When requesting the BSC to create radio resources (allocate Walsh codes) for the new multicast group, the PDSN also creates a new R-P connection (step 635) associated with this new multicast group. A message is sent from the PDSN to the BSC communicating an R-P session ID that the BSC can correlate with the new multicast group and thereby with the multicast Walsh code that the BSC assigned for this group. Note that the new multicast Walsh code is ordinarily different from the one to be used by the terminal to receive unicast traffic. The terminal is therefore able to receive messages spread by more than one Walsh code.

When the terminal that is the member of a multicast group wishes to transmit a multicast message to the group, it uses the multicast long code cover in transmitting the message to the BSC on the reverse channel. Upon receiving such a message (step 640), the BSC detects that it is a multicast message and determines if there are any other members of the group registered in its coverage area (step 645). If not, the multicast message frame is simply forwarded to the PDSN for routing to other multicast group members (step 650). If other group terminals are operating in the BSC coverage area, the multicast reflection function is activated and the message is immediately retransmitted through the appropriate BTS, directing that the transmission be spread using the multicast Walsh code associated with the targeted group (step 655). Naturally, a copy of the multicast message frame is also forwarded to the PDSN for routing to other multicast group members (step 650) in this case as well. In an alternate embodiment (not shown), the reflection function is resident in the PDSN, either in addition to or in lieu of being resident in the BSC. In such an embodiment multicast messages may be reflected through the appropriate BSC and BTS in order to reach the targeted group. The location of the multicast reflection function is determined in part by the capabilities of the equipment involved. The "reflection" is preferably performed on entire PPP/IP packets and when a BSC/PCF can delineate PPP frames the reflection function may be located there. If it cannot, the reflection function will typically reside on the PDSN or the first IP gateway component in the network.

As will be apparent, mobile CDMA terminals transmitting multicast messages will also receive them back when the reflection function is activated, but preferably are simply discarded or used as confirmation that the multicast delivery is being accomplished. In one embodiment, the node containing the reflection function will not be activated if no group member is available in the respective coverage area to receive the transmission except for the sending station (but will of course still forward the message for routing outside the CDMA network). In another alternate embodiment (also not shown) the reflection-function entity initiates a paging message to determine if there are terminals operating in the area that have not yet registered or are otherwise not yet notified of the Walsh code allocation. In this case, of course, the terminal would have to recognize a group ID in order to be able to respond appropriately.

Finally, in a preferred embodiment, the IP-layer IGMP proxy function is modified for wireless access network by relying on IGMP explicit LEAVE messages from mobile station (or other PDSN clients) to update the PDSN multicast routing tables, thus minimizing downstream defined host membership queries.

The preceding descriptions are of preferred examples for implementing the invention, in order to make its practice and application clear to one of ordinary skill in the art. The scope of the invention, however, should not necessarily be limited by this description. Rather, the scope of the present invention is defined by the following claims.

What is claimed is:

1. A system providing native physical and link layer support for handling multicast messaging in a wireless telecommunication network operating to communicate with mobile stations according to a CDMA air-interface standard, the mobile stations being members of a multicast group, said system comprising:

a base station transceiver (BTS) for communicating with the mobile stations over the air interface; and a base station controller (BSC) for including a packet control function, the BSC for controlling the BTS and assigning Walsh codes for use in message processing by the BTS and by the mobile stations, wherein the BSC assigns a first multicast Walsh code for use by the mobile station in processing multicast control messages for transmission to the mobile stations belonging to the multicast group and wherein the BSC assigns a second multicast Walsh code, "for use by the BTS in processing messages for transmission to the mobile stations being members of the multicast group" said packet control function further comprising a multicast reflection function for receiving multicast messages that have been processed by a mobile station using a long-code mask and processing the multicast messages using the second multicast Walsh code for transmission by the BTS to the mobile stations being members of the multicast group.

2. The system according to claim 1, wherein the BSC assigns the second multicast Walsh code for use by the mobile stations in processing multicast traffic transmissions intended for the multicast group in the forward direction.

3. The system according to claim 2, wherein the BSC assigns a long-code mask for use by the mobile station in processing group specific multicast traffic in the reverse direction, the reverse link long-code mask being distinct from the second multicast Walsh code.

4. The system according to claim 1, wherein the BSC maintains a database for mapping multicast addresses to at least one allocated Walsh code, such that multicast messages routed to the BSC through the wireless communication network are properly processed for delivery to mobile stations that are members of the multicast group.

5. The system according to claim 4, wherein the multicast addresses in the database are Internet Protocol (IP) addresses.

6. The system according to claim 4, wherein the database also stores multicast group names.

7. The system according to claim 4, wherein the database stores forward-link Walsh code allocations.

8. The system according to claim 4, wherein the database stores reverse-link long code mask allocations.

9. The system according to claim 4, wherein the BSC/PCF directs that multicast messages received through the wireless communication network are processed according to Walsh code allocations contained in headers of the multicast messages.

10. The system according to claim 1, further comprising a packet-data serving node (PDSN) for relaying data between the BSC and a packet-switched network.

11. The system according to claim 10, wherein the multicast reflection function is resident in the PDSN.

12. The system according to claim 1, further comprising an IP gateway for relaying data between the BSC and a packet-switched network.

13. The system of claim 12, wherein the multicast reflection function is resident on the IP gateway.

14. A method for handling multicast messages involving mobile stations in communication with a CDMA wireless network, the CDMA wireless network having at least one base station system (BSS) for communicating with mobile stations, said method comprising the steps of:
determining that a mobile station is operating in the area covered by the BSS; receiving a reverse-link request from the mobile station to join a the multicast group; determining if a Walsh code has already been assigned to the multicast group that the mobile station has requested to join and otherwise assigning a first Walsh code for processing forward link multicast messages to members of the multicast group; and transmitting a group Walsh code assignment to the mobile station on a forward link wherein the group Walsh code is formed of the already-assigned group Walsh code if the Walsh code has already been assigned to the multicast group and, otherwise, the group Walsh code is formed of the first Walsh code.

15. The method of claim 14, further comprising the steps of:
assigning a forward link multicast control-message channel; and
transmitting the multicast control-message channel to the mobile station.

16. The method of claim 14, further comprising the step of receiving a multicast message from the mobile station, the message having been processed using an assigned group long code.

17. The method of claim 16, wherein the BSS includes a multicast reflection function for receiving reverse-link multicast messages transmitted by mobile stations to the BSS and processing them for transmission from the BSS using the first Walsh code.

18. The method of claim 17, further comprising the steps of:
determining whether other multicast group members are operating within the area covered by the BSS; and
processing the received multicast message for transmission to the other group members determined to be in the coverage area.

19. The method of claim 14, further comprising the steps of:
assigning a long code mask for use by mobile stations in processing reverse link multicast messages; and
transmitting the long code mask to the mobile station.

20. The method of claim 14, wherein the CDMA network comprises a packet-data serving node (PDSN) for relaying messages between the BSS and a public packet data network.

21. The method of claim 20, further comprising the steps of:
receiving in the BSS a multicast message originating in the packet data network;
processing the received multicast using the first group Walsh code; and
transmitting the processed message.

22. The method of claim 20, further comprising the steps of:
receiving from the mobile station a multicast message that has been processed by the mobile station using the assigned group Walsh code; and
forwarding the received message to the PDSN for distribution in the packet data network.

23. The method of claim 14, wherein multicast Walsh codes are only assigned when the number of multicast group members located in the BSS coverage area exceeds a certain threshold, and further comprising the steps of determining whether the numbers of multicast group members in the BSS coverage area has exceeded the threshold.

24. The method of claim 23, further comprising the steps of:
receiving a multicast message; and
transmitting the multicast message as a unicast message to each group member operating in the BSS coverage area if the number of members in the coverage area does not exceed the threshold.

25. The method of claim 14, further comprising the step of transmitting the multicast data message as a unicast message on packet data channel.

* * * * *